United States Patent Office

2,818,456
Patented Dec. 31, 1957

2,818,456

PREPARATION OF ALLENE

Robert T. Conley, New Brunswick, and Thomas F. Rutledge, Madison, N. J., assignors to Air Reduction Company, Incorporated, New York, N. Y., a corporation of New York No Drawing. Application August 1, 1955
Serial No. 525,805

10 Claims. (Cl. 260—681)

This invention relates to a process for preparing allene and more particularly to a process for preparing allene by thermal decomposition of diketene.

Heretofore, allene has been prepared by a variety of methods. For example, A. C. Taylor et al. in United States Patent No. 2,649,495, dated August 18, 1953, reported that dichloropropane or monochloropropylene may be dehydrohalogenated in the presence of a base at temperatures between 850°–1050° C. to produce methylacetylene and the by-product, allene. This process, however, requires a period of preheating before decomposition and is readily susceptible to undesirable side reactions if the decomposition of the halohydrocarbon is not strictly controlled. This process also requires the separation of allene and methyl acetylene if the allene is to be obtained in a substantially pure state. Allene has been obtained by F. O. Rice, United States Patent No. 2,429,566, dated October 21, 1947, as one of the reaction products of the pyrolysis of isobutylene. In this process, the decomposition of isobutylene is carried out in a quartz or chrome steel tube at temperatures of 850°–900° C. and between about 50–200 millimeters pressure. The production of allene by this method is also concurrent with the production of methane, and methyl acetylene. This necessitates the separation of the various constituents before a substantially pure product is produced, and the percent yield of allene by this process is so low as to be non-commercial.

It is therefore an object of this invention to provide an improved method for the preparation of allene.

Another object of this invention is to provide a method for preparing allene by the thermal decomposition of diketene.

Still another object of this invention is to provide a method of thermally decomposing diketene to obtain increased yields and conversions of allene in which the reaction is carried out at temperatures between about 510° C. to 590° C. in a reaction chamber whose surface is composed of copper.

A still further object of this invention is to provide a method of cracking diketene to obtain increased yields of allene wherein a substantial portion of the unreacted diketene can be recovered for recycling through the reaction chamber, and the desired reaction product, allene, conveniently and readily separated and recovered.

Other objects will, in part, appear herein and, in part, be obvious from the following detailed description.

In accordance with the instant invention, it has been found that satisfactory yields of allene may be prepared by the decomposition of diketene when the reaction is carried out at temperatures within the critical range of from 510° C. to 590° C. In the preferred form of the invention, the temperature range of between 530° C. to 555° C. was found to be most desirable. It has been further ascertained that optimum yields of allene (98 percent and better) can be obtained from the decomposition of diketene at a temperature of about 550° C.

The criticality of the temperature ranges herein set forth is evidenced by the fact that deviations from these temperature ranges, either above the upper limits or below the lower limits, seriously impede the decomposition reaction and cause both the conversion and yield of allene to be so reduced that the process becomes uneconomical, i. e. excessive recycling of the products is required if a sufficient conversion and yield is to be obtained. The reaction chamber may be externally heated by any suitable means to obtain the pyrolysis temperature. Electrical heating has been found particularly efficient.

It has also been found that the pyrolysis reaction chamber should be made of, or lined with, substantially pure metallic copper. By the term "substantially pure metallic copper" is meant metallic copper which contains more than 99 percent copper and no more than trace amounts of other metallic components such as platinum, chromium, zinc, lead, magnesium, manganese, calcium, silicon, and iron. Because of the difficulties encountered with the refining of copper, the material sold as "pure" copper usually contains at least trace amounts of other metallic components. It has been observed that if diketene is pyrolized in a reaction chamber composed of materials other than copper, the course of the decomposition toward the production of the desired product, allene, is adversely affected. For example, if the pyrolysis apparatus is constructed of quartz, diketene is depolymerized almost completely to ketene. Similarly, if the reaction chamber is composed of an iron-containing material, diketene would be primarily decomposed to ketene, methane, and carbon monoxide. The reaction chamber may be of any convenient shape or design, such as a tube, as long as the internal surface thereof is composed of substantially pure metallic copper.

The diketene may be desirably diluted with an inert gas prior to its being pyrolized. Such dilution, by decreasing the contact time, is advantageous in reducing the formation of tars and other undesirable reaction products, and accordingly improves the yields of and conversions to allene. Any inert gas may be employed as the diluent for diketene. Such inert gases include nitrogen, the rare gases, such as argon, neon, etc., or mixtures thereof. The extent of dilution or the amount of diluent gas employed will depend upon a variety of factors, including the pyrolysis temperature employed, the amount of diketene to be pyrolyzed, the geometry of the reaction chamber, and the flow rate of diketene through the reaction zone. Generally, the mixture of diketene and inert gas should contain from about 70 to about 98 mole percent diketene and preferably from about 81 to about 93 mole percent diketene.

The process is preferably carried out by first premixing the diketene with a diluent inert gas to obtain a mixture containing from about 70 to about 98 mole percent diketene, and then passing the mixture continuously, or batchwise, through a reaction chamber, whose internal surface is composed of substantially pure metallic copper heated to the pyrolytically effective temperature. Allene prepared in the reaction chamber may be readily separated from the reaction mixture by a series of fractional condensations. Unreacted diketene, and other high boiling constituents are selectively condensed and separated by conducting the gaseous reaction products through a suitably cooled trap which is maintained at a temperature sufficient to condense any unreacted diketene which may be present but which is insufficient to condense the desired product, allene. The diketene collected may be recycled. The allene and ketene mixture remaining may then be circulated to a suitably cooled liquefier where the allene is condensed and recovered. This liquefier may be cooled with liquid air or liquid nitrogen, Any ketene which had formed as a by-product of the pyrolysis reaction passes off, and may be dimerized to diketene, which can then be recirculated to the pyrolysis chamber. The allene collected may be further purified to remove any residual traces of diketene and ketene by passing, as by sparging, the allene through a dilute solution of a mineral acid, such as phosphoric, nitric, hydrochloric, or, preferably, sulfuric acid. Residual traces of diketene and ketene are thus removed as acetic acid.

The invention will be more clearly understood from the following example which is set forth by way of illustration and not limitation.

Example I

Eighty-four grams (1 mole) of diketene flowing at the rate of about 1.12 grams per minute was discharged into a nitrogen stream flowing at the rate of 50 cc. per minute thereby obtaining a mixture of diketene and nitrogen in which the diketene was effectively diluted so that it represented 87 mole percent of the mixture. The diketene-nitrogen mixture was passed through a copper reactor tube made of one inch outside diameter standard copper tubing with one-sixteenth inch wall thickness and 24 inches in length. A copper thermocouple well, area 0.012 square meter, was placed in the center of the reactor. The total reactor surface area was thus approximately 550 square centimeters, and the free volume was approximately 0.175 liter. The copper used in the reactor contained trace amounts of lead, platinum, zinc, iron, chromium, silicon, magnesium, manganese, and calcium. The tube temperature was maintained at 550° C. by electrical heating. All of the diketene passed through the reactor tube in 75 minutes. The unreacted diketene was condensed by means of a 60 cm. spiral water-cooled condenser. The ketene, allene, and by-product gases were sparged through 400 cubic centimeters of dilute sulfuric acid in a scrubber. Any ketene in the mixture reacted with the acid solution, forming acetic acid. The allene was condensed in traps immersed in liquid nitrogen. The following material balance was obtained:

| Product: | Moles |
| --- | --- |
| Acetic acid | 0.800 |
| Unreacted diketene | 0.435 |
| Diketene cracked to ketene | 0.400 |
| Allene | 0.162 |

This amounted to a material balance of 99.7%, a conversion of 16.2%, and a yield of 98.0 percent.

The particular contribution of this invention is the provision of a process for preparing allene in high yields and conversions by the thermal decomposition or pyrolysis of diketene which is characterized by controlling the pyrolysis temperature between certain specified and critical limits and conducting the reaction in a reaction chamber, the internal surface of which is composed of substantially pure metallic copper. The process is further characterized by its ease of operation. The compound prepared by this improved process, allene, is an old compound which is susceptible to a variety of uses, most important of which at the present time is its suitability as a fuel component, for example, in jet and rocket propellants. Allene is further useful as an intermediate to prepare other organic compounds. For example, allene is an isomer of methyl acetylene or propyne and can be employed for reactions involving propyne, particularly for operations conducted in basic media at elevated temperatures.

It will be understood that a number of variations can be made without departing from the spirit and scope of this invention, and it is not intended to limit this invention except as defined in the appended claims.

What is claimed is:

1. The process for preparing allene which comprises pyrolyzing diketene at a temperature of from about 510° C. to about 590° C. in a reaction chamber, the internal surface of which is composed of substantially pure metallic copper.

2. The process for preparing allene which comprises pyrolyzing diketene at a temperature of about 550° C. in a reaction chamber, the internal surface of which is composed of substantially pure metallic copper.

3. The process for preparing allene which comprises pyrolyzing a mixture of diketene and an inert gas in which diketene constitutes from about 70 to about 98 mole percent of said mixture at a temperature of from about 510° C. to about 590° C. in a reaction chamber, the internal surface of which is composed of substantially pure metallic copper.

4. The process for preparing allene as defined in claim 3 wherein the pyrolysis temperature is about 550° C.

5. The process for preparing allene which comprises pyrolyzing a mixture of diketene and an inert gas in which diketene constitutes from about 81 percent to about 93 mole percent of said mixture at a temperature of from about 510° C. to about 590° C. in a reaction chamber, the internal surface of which is composed of substantially pure metallic copper.

6. The process of preparing allene as defined in claim 5 wherein the pyrolysis temperature is about 550° C.

7. The process as defined in claim 3, wherein the inert gas is nitrogen.

8. The process as defined in claim 5, wherein the inert gas is nitrogen.

9. The process for preparing allene which comprises pyrolyzing diketene at a temperature of from about 510° C. to about 590° C. in a reaction chamber, the internal surface of which is composed of substantially pure metallic copper, removing unreacted diketene and ketene formed by fractional condensation, further purifying allene by passing said allene through a dilute mineral acid solution, and recovering said allene.

10. The process for preparing allene which comprises pyrolyzing a mixture of diketene and an inert gas in which diketene constitutes from about 70 to about 98 mole percent of said mixture at a temperature of from about 510° C. to about 590° C. in a reaction chamber, the internal surface of which is substantially pure metallic copper, removing unreacted diketene and ketene formed by a series of fractional condensations, further purifying allene by passing said allene through a dilute mineral acid solution, and recovering said allene.

References Cited in the file of this patent

Fitzpatrick: J. Amer. Chem. Soc., 69, pp. 2236–37 (1947).

Boese: Industrial Eng. Chemistry, 32, pp. 16–22 (1940).